2,961,442

β-SUBSTITUTED-ETHYL PIPERAZINES

Harold E. Zaugg, Lake Forest, and Raymond J. Michaels, Jr., Mundelein, Ill., assignors to Abbott Laboratories, Chicago, Ill., a corporation of Illinois No Drawing. Filed May 28, 1957, Ser. No. 661,993

4 Claims. (Cl. 260—268)

This invention relates to a method for preparing chemical compounds and salts thereof, the base of which has the following general structure:

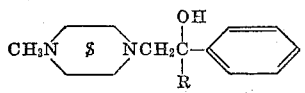

where R is phenyl or cyclohexyl.

Compounds of the foregoing structure possess valuable antispasmodic and antiparkinsonism properties and are the subject of our co-pending applications; Serial Numbers 608,657, now U.S. Patent No. 2,881,172, and 608,658, filed on September 10, 1956, now abandoned.

The process herein disclosed substantially involves adding a slight excess of a Grignard reagent to a solution of a phenacylhalide. The addition is slowly performed in an inert atmosphere until a color test shows that the Grignard complex is present in slight excess. When the reaction is complete, the Grignard complex is decomposed and the product, 2-chloro-1,1-diphenylethanol is recovered by distillation of the residue.

The product prepared by the foregoing procedure is then treated with excess alkali and heated; thereafter, the mixture is extracted to isolate 1,1-diphenylethylene oxide.

A solution of piperazine hexahydrate is combined with either of the foregoing 2-chloro-1,1-diphenylethanol and 1,1-diphenylethylene oxide and refluxed to yield the N-(β,β-diphenyl-β-hydroxyethyl)-piperazine; an addition salt of this base is prepared by treating said base with alcoholic-hydrogen chloride.

The compound, N-(β,β-diphenyl-β-hydroxyethyl)-piperazine is combined with formaldehyde and a slight excess of formic acid and the mixture is refluxed. From this mixture is isolated the base, N-(β,β-diphenyl-β-hydroxyethyl)-N'-methylpiperazine, which base is then converted to the hydrochloride acid addition salt.

One of the diphenyl groups in the compound is reduced by hydrogenation in the presence of an appropriate catalyst to prepare N-(β-cyclohexyl-β-phenyl-β-hydroxyethyl)-N'-methylpiperazine dihydrochloride. The methosulfate salt is prepared by liberating the base solution and adding thereto dimethyl sulfate.

The following examples illustrate the invention, but it should be understood that they are not intended to limit the process to the exact ingredients and proportions employed therein.

EXAMPLE I

2-chloro-1,1-diphenylethanol

Place 24 grams (1.0 mole) of magnesium turnings in a one-liter 3-necked round bottom flask fitted with a mechanical stirrer, separatory funnel, and a condenser protected with a calcium chloride drying tube. Add 75 cc. of dry ether and then a crystal of iodine to catalyze the reaction. Add a few milliliters of a solution comprising 157 grams (1.0 mole) of bromobenzene dissolved in 300 cc. of dry ether. Stir the suspension and after the initial heat of reaction has subsided, add the remaining bromobenzene-ether solution dropwise at a rate to cause vigorous refluxing. When the addition is completed, stir and reflux the reaction mixture for 1 hour longer. The total volume of this solution is 425 cc.

Place 77.5 grams (0.5 mole) of phenacyl chloride in a 2-liter 3-necked round bottom flask fitted with a mechanical stirrer, thermometer, gas-inlet tube, separatory funnel, and a vent protected with a calcium chloride drying tube. Add 750 cc. of dry ether and stir to form a clear solution. Pass a slow stream of nitrogen first through a barium oxide drying tower and then into the reaction flask producing an inert atmosphere. Cool the solution to 0° C. by means of a Dry Ice-acetone bath. At this temperature, the phenacyl chloride partially crystallizes. Add the prepared phenyl magnesium bromide solution dropwise to the stirred slurry of phenacyl chloride at a temperature of 0° to −5° C. over a period of 1½ hours. The Grignard complex precipitates out of solution as a viscous oil. Take a few drops of the reaction mixture at intervals and test with Michlers' ketone reagent for presence of excess phenyl magnesium bromide. A green color indicates excess Grignard reagent. A positive color test is obtained when 245 cc. of the prepared phenyl magnesium bromide solution has been added. This volume indicates that .576 mole of phenyl magnesium bromide has been used. Stop the addition at this point and stir the reaction mixture for ½ hour longer at 0° C. Decompose the complex by the dropwise addition of an ammonium chloride solution (100 grams of ammonium chloride dissolved in 400 cc. of water). Filter the mixture to remove the insoluble magnesium salt, and separate the ether portion. Extract the aqueous portion once with 300 cc. of ether and wash the combined ether portions once with 250 cc. of water. Dry the ether solution over approximately 50 grams of anhydrous sodium sulfate. After a few hours of drying, filter off the drying agent and remove the ether on the steam bath. Distill its residue. There is obtained a forerun of 20.6 grams of mostly recovered phenacyl chloride, B.P. 92–154°/1.5 mm., after which is obtained 85.1 grams of product 2-chloro-1,1-diphenylethanol, B.P. 154–156°/1.5 mm., yield 73.4%.

EXAMPLE II

1,1-diphenylethylene oxide

Place 23.2 grams (0.1 mole) of 2-chloro-1,1-diphenylethanol in a 100 cc. 3-necked round bottom flask fitted with a mechanical stirrer and a thermometer. Add a solution containing 8 grams (0.2 mole) of sodium hydroxide in 40 cc. of water. Stir and heat the mixture at 60–65° C. for 30 minutes. Cool the reaction mixture and then extract twice with two 150 cc. portions of ether. Concentrate the combined ether extracts to dryness on the steam bath. The residue crystallizes upon cooling, giving a quantitative yield of 1,1-diphenylethylene oxide, M.P. 49–52°. Recrystallize the material from 50 cc. of 12A absolute ethyl alcohol, M.P. 51–53°; wt. 16.5 g., yields 84.2%.

EXAMPLE III

N-(β,β-diphenyl-β-hydroxyethyl)-piperazine

Place a solution containing 7.8 grams (.04 mole) of 1,1-diphenylethylene oxide, 23.3 grams (.12 mole) of piperazine hexahydrate in 40 cc. of 3A ethyl alcohol in a 250 cc. 3-necked round bottom flask fitted with a mechanical stirrer and a condenser. Stir and reflux for 18 hours, Filter the warm reaction mixture to remove the insoluble precipitate and wash said precipitate with 20 cc. of 3A ethyl alcohol. Combine the wash with the alcohol filtrate. Cool the alcohol solution in an ice bath, whereupon the desired carbinol, N-(β,β-diphenyl-β- hydroxyethyl)-piperazine, crystallizes to give 7.8 grams, M.P. 132–135°, yield 69%. Concentrate the alcohol filtrate to dryness on the steam bath under reduced pressure. Wash the solid residue with 100 cc. of water to remove the excess piperazine and filter off the product, wt. 1.5 grams, M.P. 129–132°. Total weight of desired carbinol, 9.3 grams, yield 82.3%.

EXAMPLE IV

N-(β,β-diphenyl-β-hydroxyethyl)-piperazine

Place 70.6 grams (.364 mole) of piperazine hexahydrate and 21.1 grams (.091 mole) of 2-chloro-1,1-diphenylethanol in a 250 cc. 3-necked round bottom flask fitted with a mechanical stirrer and a condenser. Add 100 cc. of 3A ethyl alcohol, stir and reflux for 18 hours. A clear solution is first obtained, but after a short period of heating, a precipitate begins to separate out. Filter the warm reaction mixture to remove the precipitate and wash the precipitate with 15 cc. of 3A ethyl alcohol. Concentrate the combined alcohol washing and filtrate to dryness on the steam bath under reduced pressure. Wash the residue with 100 cc. of water to remove the excess piperazine and filter off the product, N-(β,β-diphenyl-β-hydroxyethyl)-piperazine, wt. 21.3 grams, M.P. 118–125°, yield 82.9%. Crystallize the crude carbinol from 50 cc. of 3A ethyl alcohol; yield 16.7 grams, 61%; M.P. 132–135°.

EXAMPLE V

N-(β,β-diphenyl-β-hydroxyethyl)-N'-methylpiperazine dihydrochloride

Place 8.5 grams (.03 mole) of N-(β,β-diphenyl-β-hydroxyethyl)-piperazine, 3.0 grams (.034 mole of 35% formaldehyde, and 2.6 grams (.043 mole) of 90% formic acid in a 100 cc. round bottom flask fitted with a condenser. Heat the mixture on the steam bath for 1½ hours and then reflux for 4 hours longer. Add 2.2 grams (.06 mole) of concentrated hydrochloric acid to the cool reaction mixture and then concentrate to dryness on the steam bath under reduced pressure. Take up the solid residue in 35 cc. of water and make the aqueous solution strongly alkaline with cooling by adding 40% sodium hydroxide solution. Extract the liberated oil twice with two 60 cc. portions of ether. Dry the combined ether extracts over anhydrous sodium sulfate. Filter off the drying agent and remove the ether on the steam bath. Take up the residue in 75 cc. of isopropyl alcohol and add excess isopropyl alcoholic hydrogen chloride to form the dihydrochloride salt. The salt precipitates immediately. Cool and filter. Dry overnight at 50° C. in a vacuum oven, yield 9.8 grams, 88.3%, M.P. 222–224°. Crystallization of the crude salt from 75 cc. of methyl alcohol gives 8.8 grams of pure salt, M.P. 226–227°, yield 80%.

EXAMPLE VI

N-(β-cyclohexyl-β-phenyl-β-hydroxyethyl)-N'-methylpiperazine dihydrochloride The product of Example V (11 grams, 0.03 mole) is added to 30 cc. of water and then 0.33 grams (about 3% based on chemical) of platinum oxide is added. The mixture is hydrogenated at 55–60° C. under 30 pounds pressure. The reduction is complete in 3–4 hours. The mixture is filtered while warm and then the filtrate is concentrated to dryness under reduced pressure. Following this drying step, about 125 cc. of 12A alcohol is added and the mixture is heated until the solid products are dissolved. Thereafter, the solution is cooled, filtered and the precipitate is dried overnight. The yield of the product is 10.6 grams (94%). The melting point is 239–241° C.

EXAMPLE VII

N-(β-cyclohexyl-β-phenyl-β-hydroxyethyl)-N'-methylpiperazine methosulfate

The product of Example VI is dissolved in 50 cc. of water and an excess of a 40% sodium hydroxide solution is added until the resulting solution is strongly alkaline. The liberated base is then extracted twice with ether or toluene. The two extractions are combined and dried over anhydrous sodium sulfate. The drying agent is filtered off and the solvent solution is concentrated to dryness. The separated base is dissolved in 75 cc. of methyl ethyl ketone and to this solution is added 4.1 grams (0.0325 mole) of dimethyl sulfate. The quaternary salt of N-(β-cyclohexyl-β-phenyl-β-hydroxyethyl)-N'-methylpiperazine is crystallized out of solution after a few minutes. The mixture is allowed to stand at room temperature for two hours and after cooling, the product N - (β-cyclohexyl-β-phenyl-β-hydroxyethyl)-N'-methyl-piperazine methosulfate, is filtered from the mixture in a yield of 12.0 grams (86%) having a melting point of 211–212° C.

The Grignard reaction of Example I can be performed in many organic solvents such as ether, toluene, xylene and the like, but it has been found that the use of benzene results in slightly higher yields, thus, making it the preferred solvent.

The hydrogenation step of Example VI can be performed on the bases prepared by the disclosed process, however, it is preferred to carry out the hydrogenation after purifying the product as the dihydrochloride salt. This step results in better yields.

A wide range of concentrations of the platinum oxide catalyst can be employed in the hydrogenation step of Example VI, but is has been found that about a 3% ratio of such catalyst to the reactant, N-(β-diphenyl-β-hydroxyethyl)-N'-methylpiperazine, provides complete reduction.

In preparing the methosulfate salt of N-(β-cyclohexyl-β-phenyl-β-hydroxyethyl)-N'-methylpiperazine, the base is liberated from the halide salt thereof and the base may be dissolved in organic solvents such as acetone, ether, chloroform, isopropyl alcohol and the like; however, it has been found that the use of methyl ethyl ketone results in a somewhat purer product and a better yield.

Others may practice the invention in any of the numerous ways which will be suggested by this disclosure to one skilled in the art. All such practice of the invention is considered to be a part hereof provided it falls within the scope of the appended claims.

We claim:

1. The method of making N-(β,β-diphenyl-β-hydroxyethyl)-piperazine which comprises reacting at least an equimolar amount of phenyl magnesium halide Grignard reagent with phenacyl halide and distilling to recover 2-halo-1,1-diphenylethanol, thereafter reacting one mole of said halo alcohol with excess piperazine hexahydrate at reflux conditions and recovering the resulting N-(β,β-diphenyl-β-hydroxyethyl)-piperazine.

2. The method of making N-(β,β-diphenyl-β-hydroxyethyl)-piperazine which comprises reacting at least an equimolar amount of phenyl magnesium bromide with phenacyl chloride and distilling to recover 2-halo-1,1-diphenylethanol, thereafter reacting one mole of said halo alcohol with about three moles of piperazine hexahydrate at reflux conditions and recovering the resulting N-(β,β-diphenyl-β-hydroxyethyl)-piperazine.

3. The method of making N-(β,β-diphenyl-β-hydroxyethyl)-N'-methylpiperazine which comprises the method of claim 2 with the added steps of reacting N-(β,β-diphenyl-β-hydroxyethyl)-piperazine with at least equimolar amounts of formaldehyde and formic acid under reflux conditions to obtain N-(β,β-diphenyl-β-hydroxyethyl)-N'-methylpiperazine.

4. The method of making N-(β-phenyl-β-cyclohexyl-β-hydroxyethyl)-N'-methylpiperazine dihydrochloride which comprises the method of claim 3 with the added steps of reacting N-(β,β-diphenyl-β-hydroxyethyl)-piperazine with excess alcoholic-hydrogen chloride, separating the dihydrochloride salt of N-(β,β-diphenyl-β-hydroxyethyl)-piperazine, thereafter partially hydrogenating said acid addition salt in the presence of a catalytic amount of platinum oxide until three moles of hydrogen are absorbed and separating the product, N-(β-phenyl-β-cyclohexyl-β-hydroxyethyl)-N'-methylpiperazine dihydrochloride.

References Cited in the file of this patent

UNITED STATES PATENTS 2,575,122    Pollard _____ Nov. 13, 1951

FOREIGN PATENTS 698,687    France _____ Nov. 28, 1930
738,690    Great Britain _____ Oct. 19, 1955

OTHER REFERENCES

Beck et al.: Jour. Amer. Chem. Soc., vol. 74, pp. 605–608 (1952).

Fieser et al.: Organic Chemistry, pp. 66 and 117–118, second edition (1950).